United States Patent
Higgins et al.

(10) Patent No.: US 9,074,402 B2
(45) Date of Patent: Jul. 7, 2015

(54) SLIDING DOOR OBSTACLE DETECTION

(75) Inventors: Christopher M. Higgins, Ypsilanti, MI (US); Jay L. Sackett, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 468 days.

(21) Appl. No.: 13/461,095

(22) Filed: May 1, 2012

(65) Prior Publication Data
US 2013/0292955 A1 Nov. 7, 2013

(51) Int. Cl.
| | |
|---|---|
| *E05F 15/40* | (2015.01) |
| *B60Q 9/00* | (2006.01) |
| *E05B 81/64* | (2014.01) |
| *E05B 83/36* | (2014.01) |
| *E05F 15/646* | (2015.01) |

(52) U.S. Cl.
CPC .............. *E05F 15/40* (2015.01); *Y10T 16/545* (2015.01); *B60Q 9/00* (2013.01); *E05Y 2400/54* (2013.01); *E05Y 2900/531* (2013.01); *E05B 83/36* (2013.01); *E05B 81/64* (2013.01); *E05F 15/646* (2015.01)

(58) Field of Classification Search
CPC .......... E05F 15/40; E05F 15/41; E05F 15/42; E05Y 2400/44; E05Y 2400/53; E05Y 2400/54; E05Y 2400/55; B60J 5/04; B60J 5/047; B60J 5/0472; B60J 5/06; B60Q 9/00
USPC ............. 296/1.04, 146.9, 146.11, 155; 49/26, 49/27, 28; 16/362
See application file for complete search history.

(56) References Cited

U.S. PATENT DOCUMENTS

| | | |
|---|---|---|
| 5,018,303 A | 5/1991 | Koura et al. |
| 6,256,930 B1 | 7/2001 | Faubert et al. |
| 6,339,305 B1 | 1/2002 | Ishihara et al. |
| 6,341,448 B1 | 1/2002 | Murray et al. |
| 6,525,499 B2 | 2/2003 | Naganuma |
| 6,700,393 B2 | 3/2004 | Haag et al. |
| 6,898,900 B2 | 5/2005 | Haag et al. |
| 7,354,097 B2 * | 4/2008 | Jackson et al. ............. 296/146.1 |
| 7,528,704 B2 | 5/2009 | Das et al. |
| 7,607,963 B2 | 10/2009 | Ishihara et al. |
| 7,814,704 B2 | 10/2010 | Suzuki et al. |
| 7,872,470 B2 | 1/2011 | Booth et al. |
| 7,977,903 B2 | 7/2011 | Kamiya |
| 2001/0042820 A1 * | 11/2001 | Wilson .......................... 250/221 |
| 2004/0095250 A1 | 5/2004 | Chapman et al. |
| 2007/0022819 A1 * | 2/2007 | Takeuchi et al. ................ 73/756 |
| 2007/0266635 A1 * | 11/2007 | Sugiura et al. .................... 49/27 |
| 2008/0303685 A1 | 12/2008 | Nakano et al. |
| 2011/0078954 A1 | 4/2011 | Ikezumi et al. |
| 2012/0267914 A1 * | 10/2012 | Thiele et al. ............... 296/146.9 |

FOREIGN PATENT DOCUMENTS

JP S54-157456 * 11/1979

* cited by examiner

*Primary Examiner* — Jason S Daniels
(74) *Attorney, Agent, or Firm* — Snell & Wilmer LLP

(57) ABSTRACT

Obstacle detection for a sliding door of a vehicle including a sensor apparatus located on or near a hinge of the sliding door and arranged to detect an obstacle in a path of the hinge of the sliding door. A controller connected to the sensor apparatus is configured to receive an obstruction signal from the sensor apparatus indicating detection of an obstacle in the path of the hinge of the sliding door.

18 Claims, 8 Drawing Sheets

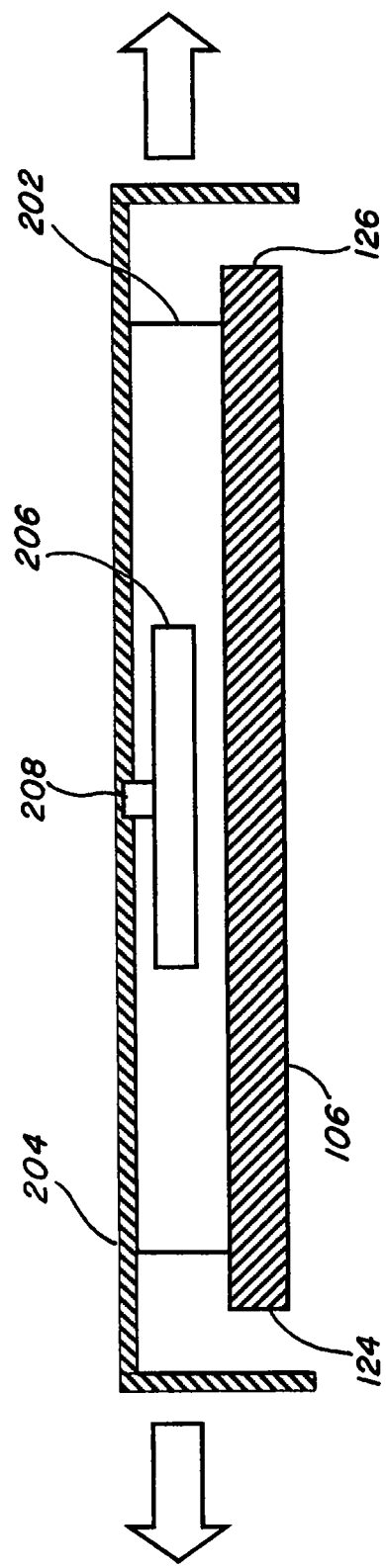

SLIDING DOOR OBSTACLE DETECTION

FIELD

The present disclosure relates to a sliding door of a vehicle, and more particularly, to a system and method for obstacle detection for the sliding door.

BACKGROUND

Vehicles such as vans often include a sliding door connected to the vehicle body with hinges. As the sliding door opens and closes, the hinges slide along door tracks on the vehicle body and a gap forms between the vehicle body and the sliding door. Some sliding doors may be powered by a motor to allow the sliding door to automatically open and close with the push of a button or by other electrical inputs. In such automatic sliding doors, an unexpected slowing in the motor speed may be used as an indicator that an object is obstructing the sliding door.

SUMMARY

In addition to, or in place of conventional obstacle detection systems discussed above, the present disclosure relates to obstacle detection in a path of a hinge of a sliding door. In particular, one embodiment of the present disclosure includes a sensor apparatus located on or near a hinge of a sliding door and arranged to detect an obstacle in a path of the hinge of the sliding door. A controller connected to the sensor apparatus is configured to receive an obstruction signal from the sensor apparatus indicating detection of an obstacle in the path of the hinge of the sliding door. By having the sensor apparatus located on or near a hinge of the sliding door, it is ordinarily possible to quickly and accurately detect an obstacle in the path of the hinge. In a further embodiment, the sensor apparatus is located on or near a lower hinge of the sliding door.

According to another embodiment, a sensor apparatus for detecting an obstacle in a path of a hinge of a sliding door includes a contact body slidably mounted on the hinge of the sliding door. At least one edge of the contact body extends beyond an edge of the hinge into the path of the hinge. The sensor apparatus also includes a sensor arranged to detect motion of the contact body relative to the hinge of the sliding door. In a further embodiment, the sensor includes a bidirectional switch arranged to detect motion of the contact body in a first direction relative to the hinge and to detect motion of the contact body in a second direction relative to the hinge. The detection of motion in the first direction by the sensor corresponds to detection of an obstacle as the hinge moves in the second direction in the path of the hinge. Similarly, the detection of motion in the second direction by the sensor corresponds to detection of an obstacle as the hinge moves in the first direction in the path of the hinge.

According to another embodiment, a hinge assembly for a sliding door includes a hinge connecting the sliding door with a door track of the vehicle. A first sensor apparatus is mounted adjacent a first edge of the hinge and extends into a path of the hinge. The first sensor apparatus is arranged to detect an obstacle in the path of the hinge. In a further embodiment, a second sensor apparatus is mounted adjacent a second edge of the hinge and extends into the path of the hinge in a substantially opposite direction from the first sensor apparatus. By virtue of having the first sensor apparatus mounted on the first edge and the second sensor apparatus mounted on the second edge, obstacles can ordinarily be detected in both directions in the path of the hinge.

In yet another embodiment, a latch assembly capable of detecting an obstacle in a path of a hinge of a sliding door includes a latch cover mounted on the hinge of the sliding door. A latch is constructed to move within the latch cover and a sensor apparatus is arranged to detect movement of the latch with respect to the latch cover. By detecting movement of the latch, it is usually possible to quickly and accurately detect an obstacle in the path of the hinge.

BRIEF DESCRIPTION OF THE DRAWINGS

The features and advantages of the embodiments of the present disclosure will become more apparent from the detailed description set forth below when taken in conjunction with the drawings. Naturally, the drawings and their associated descriptions illustrate example arrangements within the scope of the claims and do not limit the scope of the claims. Reference numbers are reused throughout the drawings to indicate correspondence between referenced elements.

FIG. 2B is a cross section view of the sensor apparatus and hinge of FIG. 2A.

DETAILED DESCRIPTION

In the following detailed description, numerous specific details are set forth to provide a full understanding of the present disclosure. It will be apparent, however, to one ordinarily skilled in the art that the present invention may be practiced without some of these specific details. In other instances, well-known structures and techniques have not been shown in detail to avoid unnecessarily obscuring the present disclosure.

Figure 1:
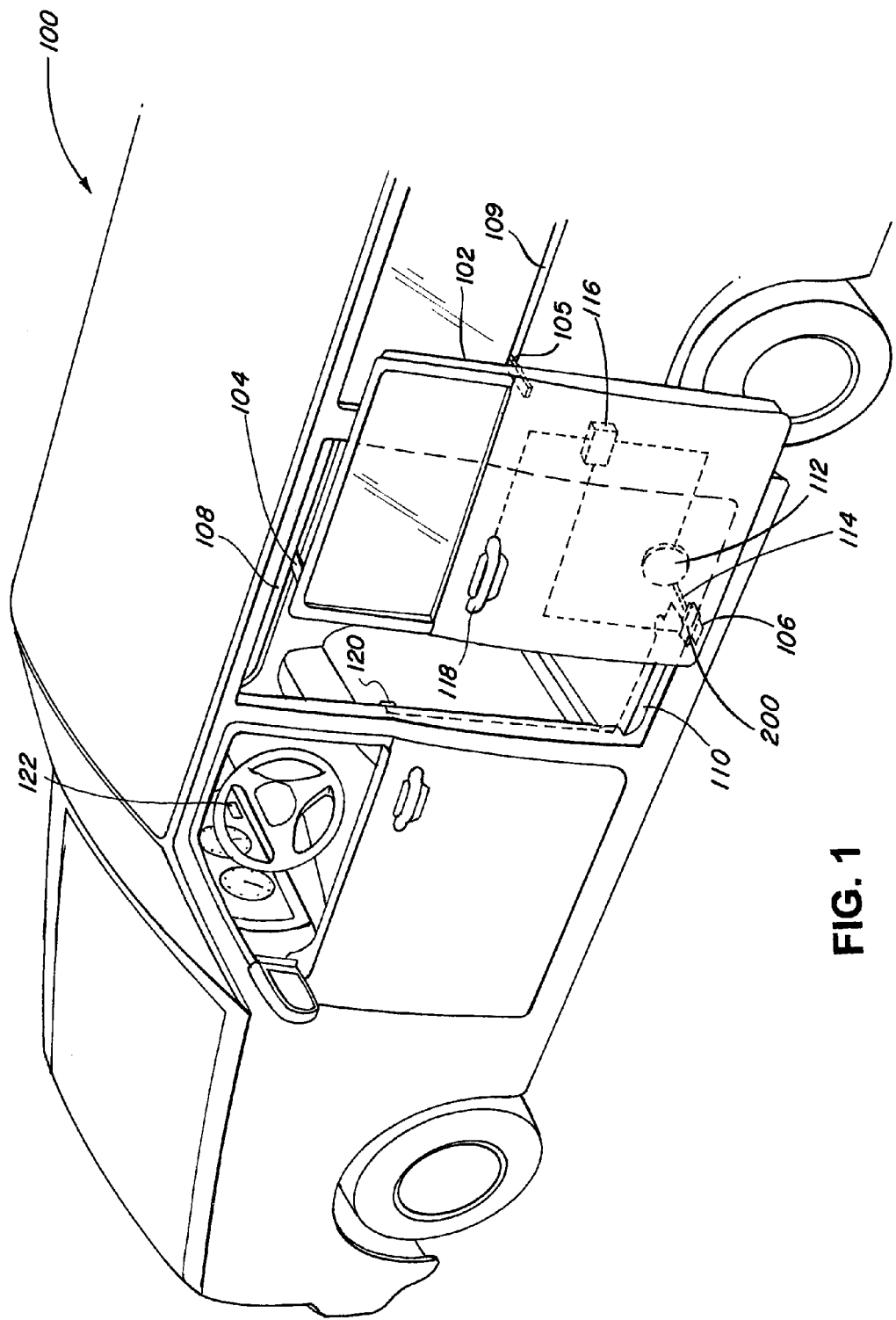
FIG. 1 depicts a vehicle with a sliding door according to an embodiment of the present disclosure.

FIG. 1 depicts a vehicle 100 with a sliding door 102 according to an example embodiment. The vehicle 100 may be any vehicle with a sliding door, such as a minivan or sedan. As shown in FIG. 1, the sliding door 102 is in a partially open position, with a fully open position being where the sliding door 102 is fully slid toward the rear of the vehicle 100. In the embodiment of FIG. 1, the sliding door 102 is connected to the vehicle 100 by an upper hinge 104, a middle hinge 105, and a lower hinge 106. The upper hinge 104 slides in an upper door track 108 in the body of the vehicle 100. Similarly, the middle hinge 105 slides in a middle door track 109 and the lower hinge 106 slides in a lower door track 110. The sliding door 102 is a powered sliding door which is capable of opening and closing in response to an input, such as an input received from a key fob (not shown) or from a door open/close button 120 inside the vehicle 100. As will be appreciated by those of ordinary skill in the art, the obstacle detection disclosed herein is not limited to powered sliding doors and may involve sliding doors that are manually opened or closed.

As a powered sliding door, the sliding door 102 includes a motor 112 that is mechanically coupled to a conveying mechanism 114, such as a belt, cable or gear to propel the sliding door 102 along the lower door track 110. In some embodiments, the conveying mechanism 114 may propel the sliding door along other door tracks, such as the upper door track 108 or the middle door track 109. A controller 116 supplies a control signal to the motor 112 so as to control the motor 112 to drive the conveying mechanism 114 in a forward or reverse direction, thereby automatically opening or closing the sliding door 102. The controller 116 may include a processor and a computer readable medium residing in an Application Specific Integrated Circuit (ASIC). In some embodiments, the controller 116 can be integrated with the motor 112.

In the embodiment of FIG. 1, a handle 118 is electrically connected to the controller 116 so as to provide a signal to the controller 116 indicating when the sliding door has been unlatched from a fully closed position or when the sliding door 102 has been unlatched from a fully open position. The controller 116 is also electrically connected to the door open/close button 120 and to a sensor apparatus 200 mounted on the lower hinge 106.

In the present disclosure, mounted on can refer to mounting directly or indirectly onto a surface, regardless of the orientation of the surface, so as to include bottom, top and side surfaces. In addition, the sensor apparatuses of the present disclosure are not limited to an area on or near a lower hinge of a sliding door. As will be appreciated by those of ordinary skill in the art, the sensor apparatuses of the present disclosure may also be located on or near other hinges, such as the upper hinge 104 and/or the middle hinge 105.

The sensor apparatus 200 communicates detection of an obstacle in the path of the lower hinge 106 to the controller 116, and in turn, the controller 116 can, for example, reverse a direction of the motor 112, stop the motor 112, or briefly reverse the direction of the motor 112 before stopping the motor 112. The controller 116 may enable illumination of a warning light 122 inside the vehicle 100 and/or enable an audible alarm after receiving an obstruction signal from the sensor apparatus 200 indicating detection of an obstacle. Such an audible alarm can sound through speakers (not shown) located within the vehicle 100. This is further described below with reference to the obstacle detection process of FIG. 7. In some embodiments, the controller 116 may only enable illumination of the warning light 122 and/or enable an audible alarm without Controlling the motor 112.

Figure 2A:
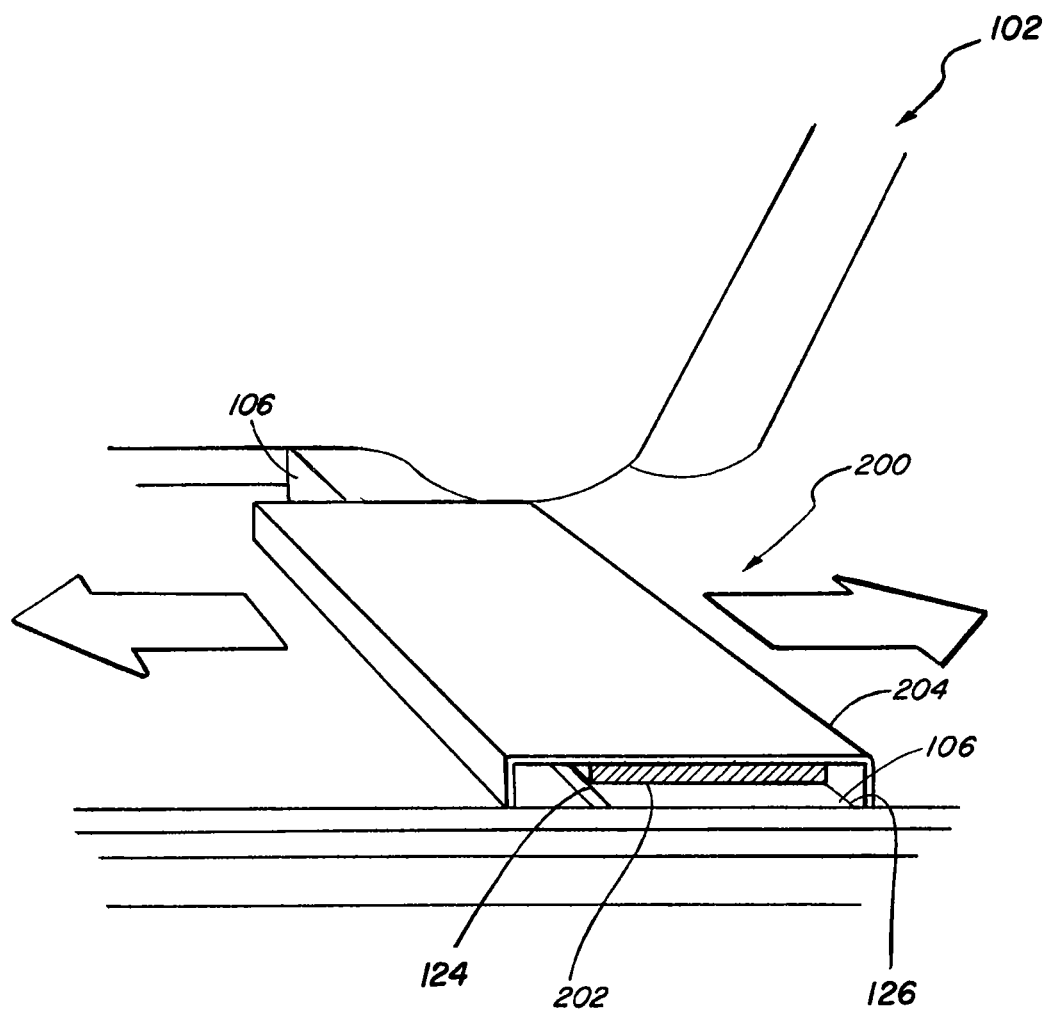
FIG. 2A is a perspective view of a sensor apparatus mounted on a hinge according to an embodiment of the present disclosure.

FIG. 2A is a perspective view of the sensor apparatus 200 mounted on the lower hinge 106 according to one embodiment. The sensor apparatus 200 includes a contact body 204 and a base 202, which is mounted on the lower hinge 106. In the embodiment of FIG. 2A, the contact body 204 is slidably mounted on the lower hinge 106 via the base 202, which is fixed to the lower hinge 106. The base 202 may be, for example, composed of a smooth material such as a plastic resin. The contact body 204 can slide in the directions indicated by the opposing arrows shown in FIG. 2A. These arrows indicate a first and a second direction in a path of the lower hinge 106 as the sliding door 102 opens or closes.

As shown in FIG. 2A, the contact body 204 extends beyond a first edge 124 and beyond a second edge 126 of the lower hinge 106. Since the contact body 204 extends beyond the lower hinge 106 into the path of the lower hinge 106, the contact body 204 ordinarily contacts an obstacle in the path of the lower hinge 106 before the obstacle contacts the lower hinge 106. In addition, the ends of the contact body 204 that extend into the path bend downward to provide a larger surface for contacting an obstacle in the path of the lower hinge 106. However, in some embodiments, the ends of the contact body 204 can bend upwards or may not be bent at all. In this regard, the sensor apparatus 200 can also be located below the lower hinge 106 instead of being located above the lower hinge 106.

FIG. 2B is a cross section view of the sensor apparatus 200 and the lower hinge 106 of FIG. 2A. As shown in FIG. 2B, the base 202 is located between the contact body 204 and the hinge 106. Although FIG. 2B depicts the base 202 in contact with the contact body 204, there may be a gap between the base 202 and the contact body 204 in some embodiments.

In FIG. 2B, the base 202 houses most of a sensor 206 which is arranged to detect motion of the contact body 204 relative to the lower hinge 106 and the base 202. Such motion ordinarily occurs when an obstacle in the path of the lower hinge 106 contacts the contact body 204. In the example of FIG. 2B, the sensor 206 includes a lever 208 of a bidirectional switch that is connected to the contact body 204 and is biased to a center position. In operation, when the contact body 204 contacts an obstacle in the path of the lower hinge 106, the lever 208 slides with the contact body 204 and generates an obstruction signal which is transmitted to the controller 116. By having a bidirectional switch, the sensor 206 can ordinarily detect motion of the contact body 204 in both directions indicated by the arrows in FIG. 2B, and can thereby indicate on which side of the lower hinge 106 an obstacle has been detected. In some embodiments, the sensor 206 may only detect motion of the contact body 204 in a single direction by using, for example, a single unidirectional switch.

In some embodiments, the locations of the sensor 206 and/or the base 202 may vary depending upon the design of the lower hinge 106 or other design considerations. In one example embodiment, the bidirectional switch of the sensor 206 may be replaced by two separate switches for generating two different obstruction signals corresponding to obstacle detection on different sides of the contact body 204. In some embodiments, the sensor 206 may include a potentiometer or rotary switch with a corresponding lever or rotor arranged similarly to the lever 208. In the case where the sensor 206 includes a rotary switch, the sensor 206 generates an obstruction signal upon rotation of the contact body 204 relative to the lower hinge 106 and the base 202.

Figure 3:
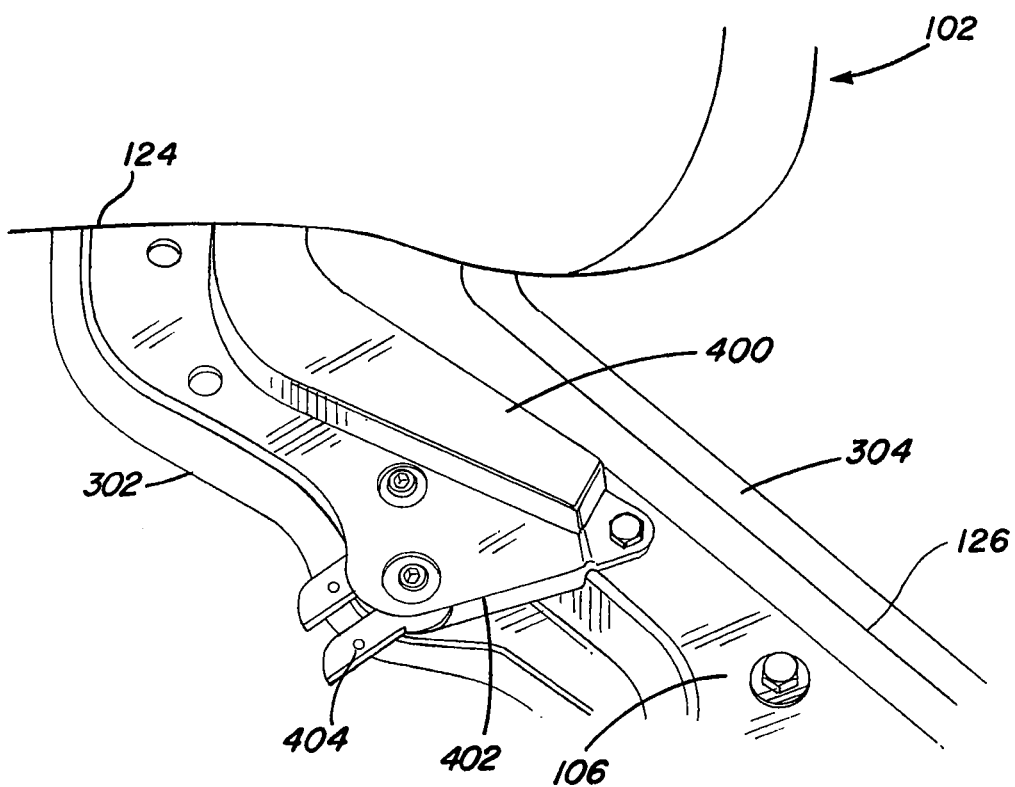
FIG. 3 depicts a hinge assembly with a sensor apparatus according to an embodiment of the present disclosure.

FIG. 3 depicts a hinge assembly for detecting an obstacle in the path of the lower hinge 106. In addition, FIG. 3 also depicts a latch assembly 400 mounted on the lower hinge 106. The latch assembly 400 includes a latch cover 402 and a latch 404 for holding the sliding door 102 in a fully open position when the latch 404 couples with a striker 406 (shown in FIG. 5).

The hinge assembly of FIG. 3 includes the lower hinge 106, a first sensor apparatus 302 mounted on the first edge 124 of the lower hinge 106, and a second sensor apparatus 304 mounted on the second edge 126 of the lower hinge 106. As shown in FIG. 3, the first sensor apparatus 302 and the second sensor apparatus 304 are mounted along a substantial portion of the first edge 124 and the second edge 126, respectively. In some embodiments, the first sensor apparatus 302 and/or the second sensor apparatus 304 may only be mounted along specific portions of the first edge 124 and/or the second edge 126.

As shown in FIG. 3, the first sensor apparatus 302 extends into the path of the lower hinge 106 in a first direction while the second sensor apparatus 304 extends into the path of the lower hinge 106 in a second direction substantially opposite the first direction. In the embodiment of FIG. 3, the first sensor apparatus 302 and the second sensor apparatus 304 are wire-type contact sensors which include a hollow rubber body having wires arranged inside so as to contact each other when the hollow rubber body is compressed. In some embodiments, the first sensor apparatus 302 and/or the second sensor apparatus 304 can be a capacitive contact sensor instead of a wire-type contact sensor. As with the sensor apparatus of FIGS. 2A and 2B, the first sensor apparatus 302 and the second sensor apparatus 304 are electrically connected to the controller 116 so as to provide an obstruction signal to the controller 116 indicating detection of an obstacle in the path of the lower hinge 106.

As will be appreciated by those of ordinary skill in the art, either the first sensor apparatus 302 or the second sensor apparatus 304 can be omitted without departing from the spirit or scope of the present disclosure.

Figure 4:
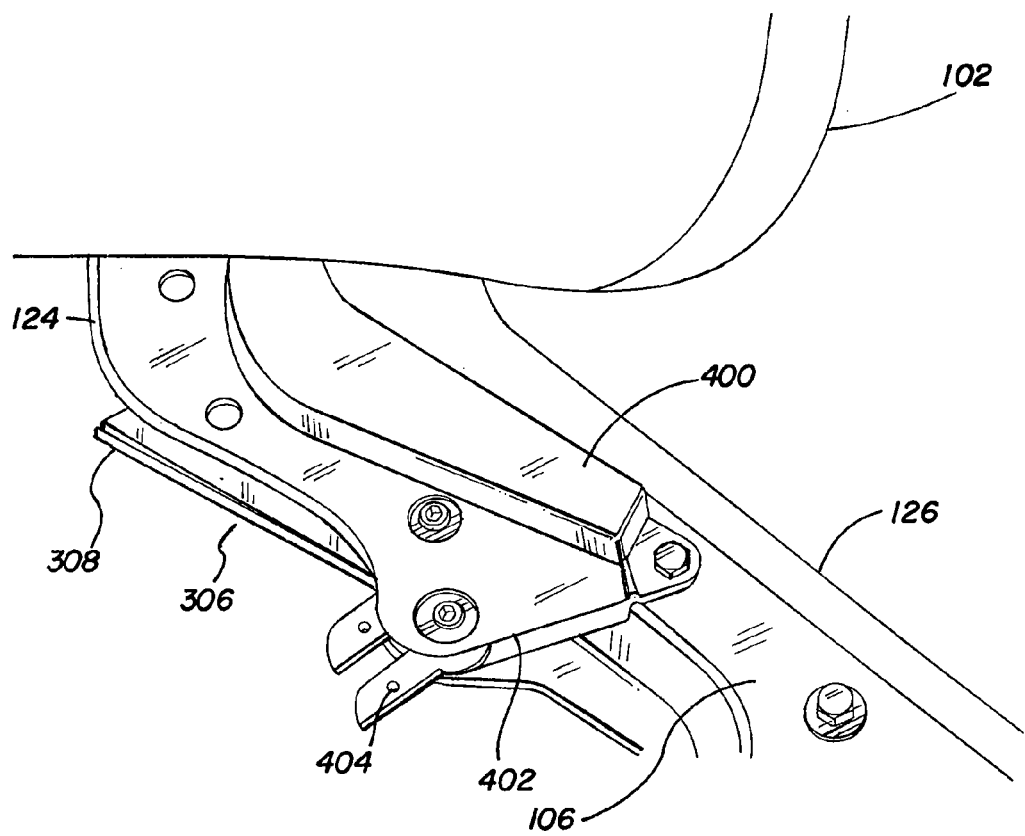
FIG. 4 depicts a hinge assembly with a sensor apparatus including a switch according to an embodiment of the present disclosure.

FIG. 4 depicts a hinge assembly that includes the lower hinge 106 and a sensor apparatus 306 for detecting an obstacle in the path of the lower hinge 106. In the example embodiment of FIG. 4, the sensor apparatus 306 is a contact switch mounted adjacent the first edge 124 of the lower hinge 106. The sensor apparatus 306 includes a contact lever 308 which extends into the path of the lower hinge 106. In operation, the sensor apparatus 306 generates an obstruction signal that is sent to the controller 116 when an object contacts the contact lever 308.

Figure 5:
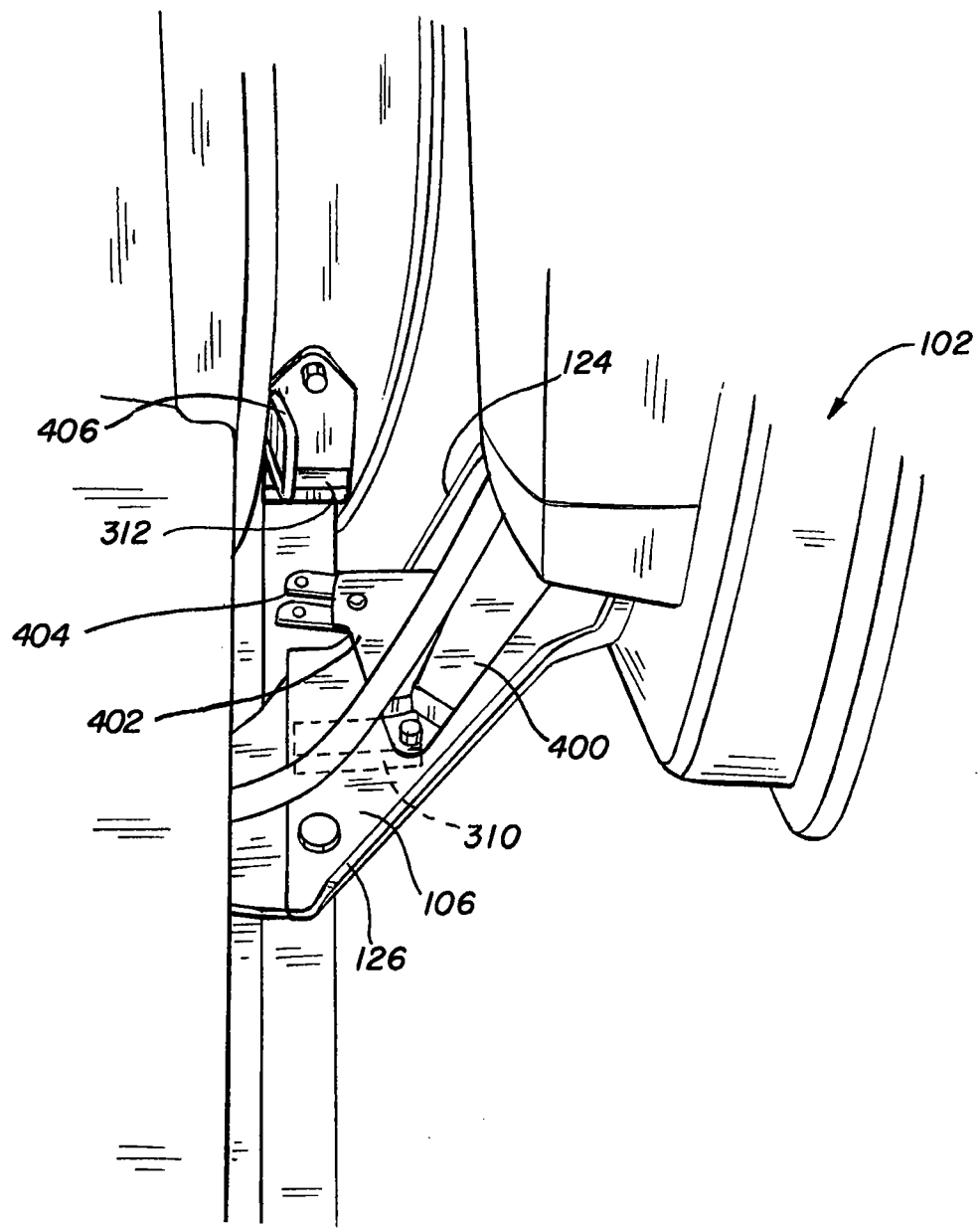
FIG. 5 depicts a hinge assembly with a sensor apparatus including a light sensor according to an embodiment of the present disclosure.

FIG. 5 depicts a hinge assembly that includes the lower hinge 106 and a sensor apparatus 310 mounted on the bottom of the lower hinge 106. The sensor apparatus 310 is a light curtain sensor that receives light from a light transmitter 312 located near an end of the path of the lower hinge 106. In operation, the sensor apparatus 310 sends an obstruction signal to the controller 116 when light transmitted from the light transmitter 312 is not received by the sensor apparatus 310. In some embodiments, the sensor apparatus 312 can be located in other positions on or near a hinge depending upon the location of the light transmitter 312.

Figure 6:
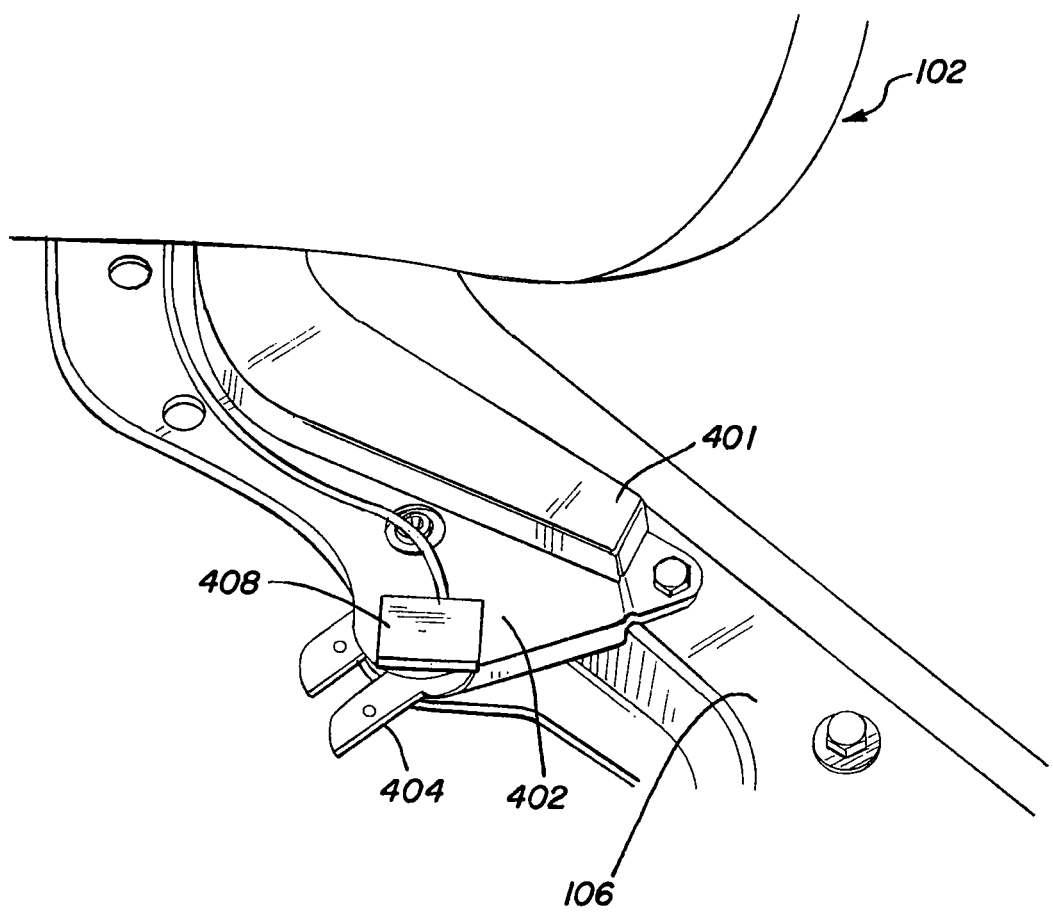
FIG. 6 depicts a latch assembly with a sensor apparatus according to an embodiment of the present disclosure.

As with the latch assembly 400 of FIGS. 3 through 5, a latch assembly 401 of FIG. 6 includes a latch cover 402 and a latch 404. However, the latch assembly 401 of FIG. 6 differs from the latch assembly 400 in that it includes a sensor apparatus 408 arranged to detect movement of the latch 404 with respect to the latch cover. In this regard, the sensor apparatus 408 can include various devices to detect movement of the latch 404, such as a rotary switch, standard switch, or potentiometer that can be activated directly by the latch 404 or by an internal component of the latch assembly 401. In operation, the sensor apparatus 408 sends an obstruction signal to the controller 116 when the sensor apparatus 408 detects movement of the latch 404. The controller 116 determines that the latch 404 has encountered an obstacle in the path of the lower hinge 106 if the sliding door 102 has not reached its fully open position. The position of the sliding door 102 can be obtained, for example, by using position sensors along the upper door track 108 or along the lower door track 110, or by calculation of known relationships between the speed of the motor 112 and the length of the lower door track 110.

Figure 7:
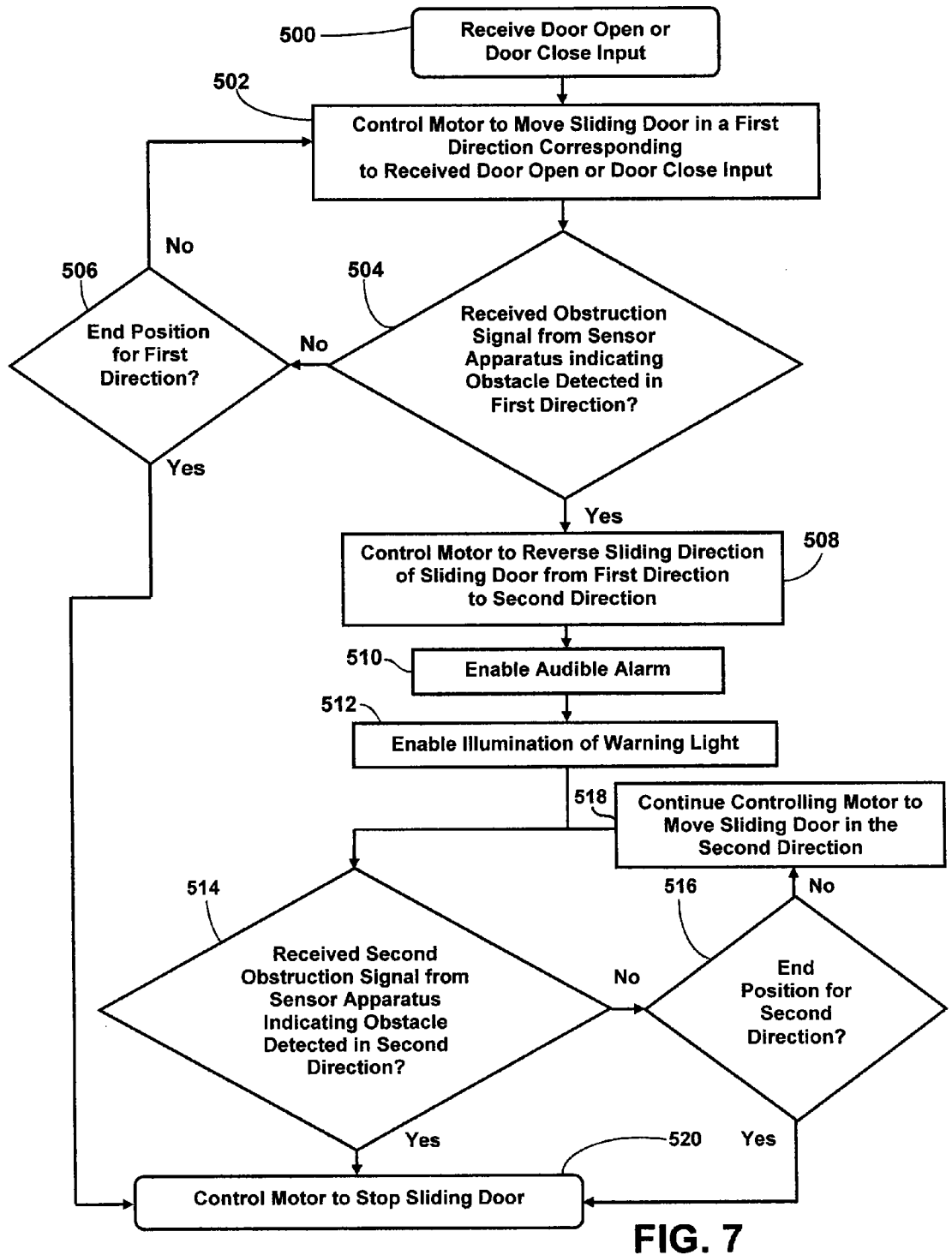
FIG. 7 is a flowchart for an obstacle detection process according to an embodiment of the present disclosure.

FIG. 7 is a flowchart for an obstacle detection process performed by the controller 116 according to an example embodiment. In block 500, the controller 116 receives a door open or a door close input, such as from the door open/close button 120 or from the handle 118. In response to the door open or door close input, the controller 116 in block 502 controls the motor 112 to move the sliding door 102 in a first direction corresponding to the received door open or door close input. For example, if the sliding door 102 is in a closed position, the controller 116 receives a door open input when the door open/close button 120 is pressed. The motor 112 is then controlled by the controller 116 in block 502 so that the sliding door 102 opens toward the rear of the vehicle 100. On the other hand, if the sliding door is in the fully open position, the controller 116 receives a door close input when the door open/close button 120 is pressed.

In block 504, the controller 116 checks whether it has received an obstruction signal from the sensor apparatus indicating detection of an obstacle in the first direction of the path of the lower hinge 106. If no obstruction signal has been received in block 504, the process proceeds to block 506 and the controller 116 determines whether the sliding door 102 has reached an end position for the first direction. As noted above with reference to FIG. 6, the controller 116 can determine whether the sliding door 102 has reached a fully open position or a fully closed position by using, for example, a position sensor along a door track, or by calculation of known relationships between the speed of the motor 112 and the length of the lower door track 110. If the controller 116 determines in block 506 that the end position for the first direction has been reached, the controller 116 controls the motor 112 to stop the sliding door 102 in block 520. If the controller 116 determines in block 506 that the end position for the first direction has not been reached, the process returns to block 502 to continue moving the sliding door 102 in the first direction.

Returning to block 504, if the controller 116 receives an obstruction signal indicating detection of an obstacle in the first direction, the controller 116 controls the motor 112 to reverse its direction so as to move the sliding door 102 in a second direction opposite the first direction. In alternative embodiments, the controller 116 may control the motor 112 so as to take a different action, such as stopping the sliding door 102. After block 508, the controller 116 enables an audible alarm through speakers of the vehicle 100 in block 510. The controller 116 also enables illumination of the warning light 122 in block 512. In alternative embodiments, blocks 510 and/or 512 may be omitted.

In block 514, the controller 116 determines whether a second obstruction signal is received indicating that an obstacle is detected in the second direction as the sliding door 102 reverses its direction. If the controller 116 receives a second obstruction signal in block 514, the controller 116 controls the motor 112 to stop the sliding door 102 in block 520. On the other hand, if the controller 116 does not receive a second obstruction signal in block 514, the controller 116 checks whether the sliding door 102 has reached an end position for the second direction in block 516. As with the end position for the first direction in block 506, the end position for the second direction in block 516 is either the fully open door position or the fully closed door position. In alternative embodiments, the controller 116 may control the motor 112 to stop the sliding door 102 before reaching the end position for the second direction.

If the controller 116 determines in block 516 that the sliding door 102 has reached the end position for the second direction, the controller 116 controls the motor 112 to stop the sliding door 102 in block 520. If not, the process proceeds to block 518 to continue controlling the motor 112 to move the sliding door 102 in the second direction and the process returns to block 514.

Those of ordinary skill will appreciate that the various illustrative logical blocks and process steps described in connection with the examples disclosed herein may be implemented as electronic hardware, computer software, or combinations of both. Whether such functionality is implemented as hardware or software depends upon the particular application and design constraints imposed on the overall system. Ordinarily skilled artisans may implement the described functionality in varying ways for each particular application, but such implementation decisions should not be interpreted as causing a departure from the scope of the disclosed apparatuses and methods.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the claimed invention. Various modifications to these examples will be readily apparent to those of ordinary skill in the art, and the principles disclosed herein may be applied to other examples without departing from the spirit or scope of the claims. The described embodiments are to be considered in all respects only as illustrative and not restrictive and the scope of the invention is, therefore, indicated by the following claims rather than by the foregoing description. All changes which come within the meaning and range of equivalency of the claims are to be embraced within their scope.

What is claimed is:

1. An obstacle detection system for a sliding door of a vehicle, the obstacle detection system comprising:
    a door track coupled to the vehicle;
    a hinge having a proximal end coupled to the door track and configured to move along the door track and a distal end connected to the sliding door, such that when the sliding door is open, the distal end is extending from the vehicle;
    a sensor directly connected to the hinge and configured to detect an obstacle in a path of the hinge; and
    a controller coupled to the sensor and configured to receive an obstruction signal from the sensor in response to the sensor detecting that the obstacle is in the path of the hinge.

2. The obstacle detection system of claim 1, wherein the hinge is a lower hinge of the sliding door.

3. The obstacle detection system of claim 1, wherein the controller is configured to control a motor of the sliding door to stop or to reverse a sliding direction of the sliding door from a first direction to a second direction in response to receiving the obstruction signal.

4. The obstacle detection system of claim 3, wherein the controller is configured to receive a second obstruction signal from the sensor when a second obstacle is in the path of the hinge in the second direction and control the motor of the sliding door to stop the sliding door from sliding in the second direction in response to receiving the second obstruction signal.

5. The obstacle detection system of claim 1, wherein the sensor comprises:
    a first sensor configured to detect a first obstacle in the path of the hinge in a first direction; and
    a second sensor configured to detect a second obstacle in the path of the hinge in a second direction.

6. The obstacle detection system of claim 1, wherein the sensor further comprises at least one of a wire-type contact sensor, a capacitive contact sensor, a switch, or a light sensor configured to detect an obstacle in the path of the hinge of the sliding door.

7. The obstacle detection system of claim 1, wherein the controller is configured to enable an audible alarm or an illumination of a warning light in response to receiving the obstruction signal.

8. A system for detecting an obstacle in a path of a hinge of a sliding door of a vehicle having a door track, the system comprising:
    a hinge having a proximal end coupled to the door track and configured to move along the door track and a distal end connected to the sliding door, such that when the sliding door is open, the distal end is extending from the vehicle;
    a contact body slidably mounted on the hinge such that at least one edge of the contact body extends beyond an edge of the hinge into the path of the hinge; and
    a sensor configured to detect motion of the contact body relative to the hinge.

9. The system of claim 8, wherein the hinge is a lower hinge of the sliding door.

10. The system of claim 8, wherein the sensor includes a bidirectional switch configured to detect motion of the contact body in a first direction relative to the hinge and to detect motion of the contact body in a second direction relative to the hinge;
    whereby detection of motion in the first direction by the sensor corresponds to detection of an obstacle as the hinge moves in the second direction in the path of the hinge and detection of motion in the second direction by the sensor corresponds to detection of an obstacle as the hinge moves in the first direction in the path of the hinge.

11. The system of claim 8, wherein the sensor includes at least two switches configured to detect motion of the contact body relative to the hinge.

12. The system of claim 8, wherein the sensor includes a rotary switch or a potentiometer configured to detect motion of the contact body relative to the hinge.

13. The system of claim 8, further comprising a base located between the contact body and the hinge and configured to house at least a portion of the sensor.

14. A hinge assembly for a sliding door of a vehicle, the hinge assembly comprising:
    a door track coupled to the vehicle;
    a hinge having a first edge, a proximal end coupled to the door track and configured to move along the door track and a distal end connected to sliding door, such that when the sliding door is open, the distal end is extending from the vehicle; and
    a first sensor mounted adjacent the first edge of the hinge, extending into a path of the hinge and configured to detect an obstacle in the path of the hinge.

15. The hinge assembly of claim 14, wherein the hinge couples a lower portion of the sliding door with the door track.

16. The hinge assembly of claim 14, further comprising a second sensor mounted adjacent a second edge of the hinge and extending into the path of the hinge in a substantially opposite direction from the first sensor.

17. The hinge assembly of claim 14, wherein the first sensor comprises at least one of a wire-type contact sensor, a capacitive contact sensor, a switch, or a light sensor configured to detect an obstacle in the path of the hinge.

18. A system for detecting an obstacle in a path of a hinge of a sliding door, the system comprising:

a contact body slidably mounted on the hinge such that at least one edge of the contact body extends beyond an edge of the hinge into the path of the hinge; and a sensor including a bidirectional switch configured to detect motion of the contact body in a first direction relative to the hinge and to detect motion of the contact body in a second direction relative to the hinge.

\* \* \* \* \*